US005617961A

United States Patent [19]
Konstant et al.

[11] Patent Number: 5,617,961
[45] Date of Patent: Apr. 8, 1997

[54] LOAD TRANSFER AND RETURN SYSTEM

[75] Inventors: Anthony N. Konstant, Winnetka; John F. Pater, Northbrook, both of Ill.

[73] Assignee: Konstant Products, Inc., Skokie, Ill.

[21] Appl. No.: 481,899

[22] Filed: Jun. 7, 1995

[51] Int. Cl.⁶ ...................................................... A47F 5/08
[52] U.S. Cl. .......................... 211/151; 211/162; 211/59.2; 414/276; 414/286
[58] Field of Search ................................. 211/59.2, 70.4, 211/151, 162; 414/276, 286

[56] References Cited

U.S. PATENT DOCUMENTS

| | | | |
|---|---|---|---|
| 2,786,578 | 3/1957 | De Graaf et al. | 211/59.2 |
| 3,399,784 | 9/1968 | Buchbinder et al. | 211/162 X |
| 3,942,814 | 3/1976 | Buhler | 414/286 X |
| 4,168,780 | 9/1979 | Parrott | 211/151 |
| 4,485,910 | 12/1984 | Tabler | 414/286 X |
| 4,773,546 | 9/1988 | Konstant | 211/162 X |
| 4,982,851 | 1/1991 | Konstant | 211/162 X |
| 5,285,909 | 2/1994 | Slater | 211/151 |
| 5,350,270 | 9/1994 | Stallard et al. | 211/151 X |
| 5,476,180 | 12/1995 | Konstant | 414/286 X |

*Primary Examiner*—Ramon O. Ramirez
*Assistant Examiner*—Michael J. Turgeon
*Attorney, Agent, or Firm*—Niro, Scavone, Haller & Niro

[57] ABSTRACT

A load transfer and return storage rack system is provided where the wheeled carts or empty pallets or slip sheets may be selectively and automatically transferred from a pair of feed rails to a pair of return rails.

27 Claims, 15 Drawing Sheets

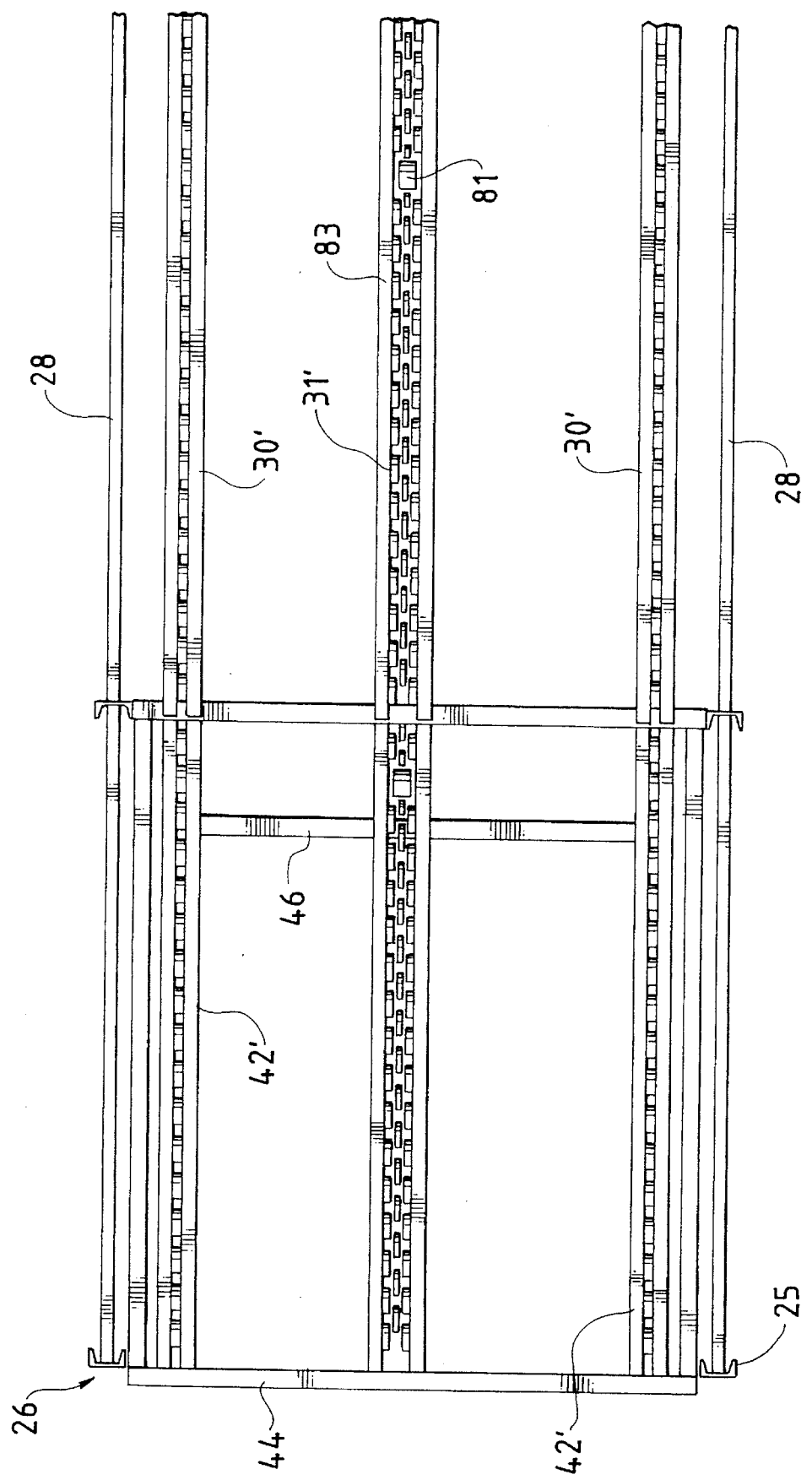

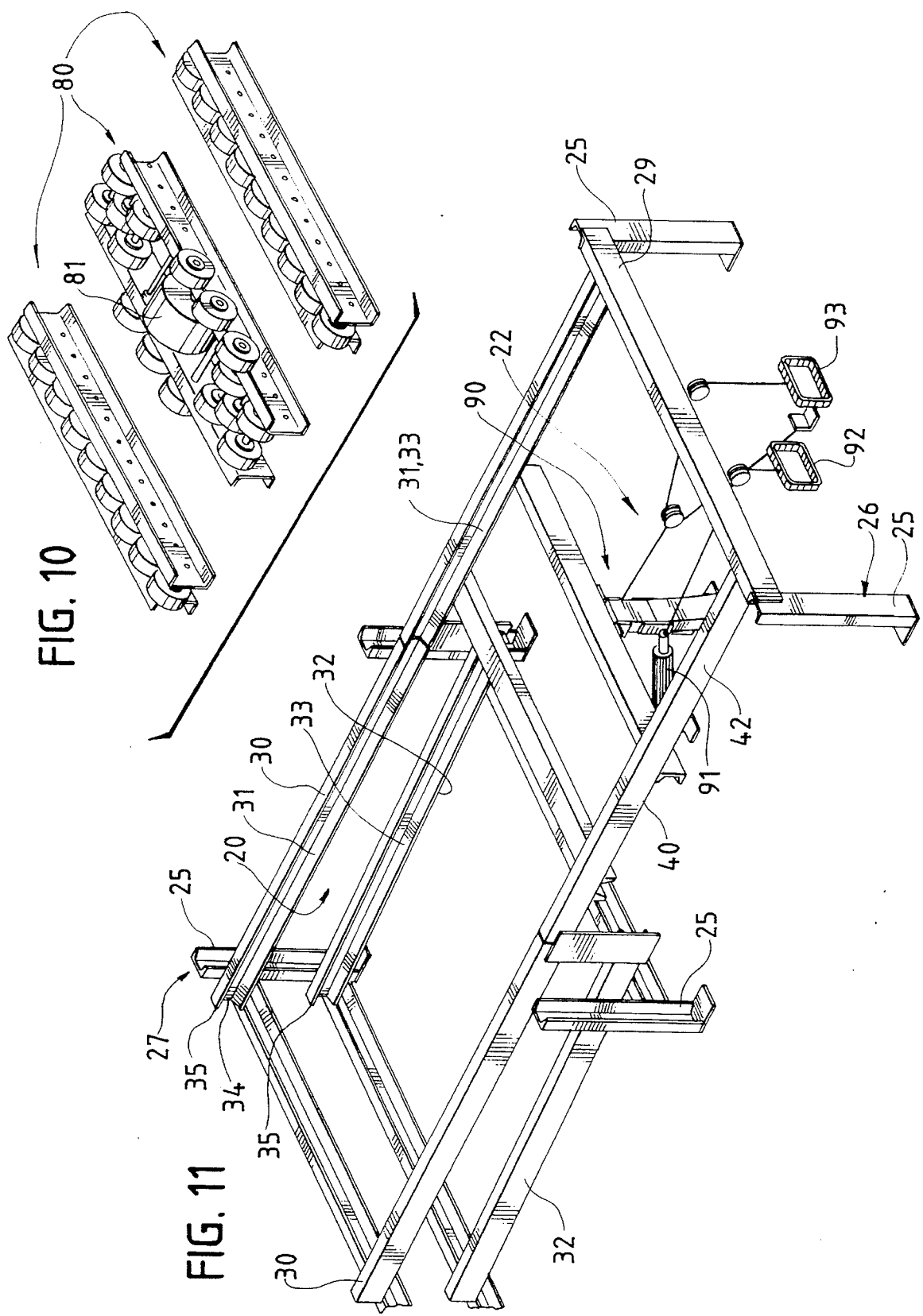

LOAD TRANSFER AND RETURN SYSTEM

BACKGROUND OF THE INVENTION

The present invention relates generally to cart or pallet return storage systems and more particularly, to improved load transfer with cart or pallet return systems that selectively and efficiently transfer unloaded carts, unloaded carts and pallets or unloaded pallets from a storage position to a position where they may be reloaded, replaced or re-used.

U.S. Pat. No. 5,170,896 issued on Dec. 15, 1992 in the name of Anthony N. Konstant and was assigned to Konstant Products, Inc. (hereinafter referred to as the "Konstant '896 patent" and incorporated herein by reference). The Konstant '896 patent teaches, among other things, a cart return storage system in which unloaded wheeled carts (or carts and pallets) are selectively and automatically transferred from an unloading or stored end to a loading or return end where they may be conveniently stored, repositioned or re-used. Similarly, in Mr. Konstant's pending application, Ser. No. 08/237,441 filed on May 3, 1994, and assigned to Konstant Products, Inc. (the "Konstant application"), another transfer and return system is taught. Such systems transfer a cart to an unloading position and then to a reloading position without an operator having to physically remove the pallet or the cart until it is in position to be reloaded.

The systems and devices disclosed in the Konstant '896 patent and the Konstant application satisfy the many needs of storage for customers. For example, they provide systems that are capable of achieving the highest possible storage density within a particular storage area, on a first-in, first-out inventory basis. Additionally, such systems maintain the efficiency of push-back rack-type systems and provide numerous advantages, such as selective and automatic transfer for cart return and reloading.

Generally, in order to selectively and automatically effectuate transfer, such systems typically require carts that are specifically designed and constructed. For example, the front set of wheels of the carts of such systems are typically spaced further out from the side of the carts than the rear wheels. In addition, guide wheels or other means are usually provided to keep the cart in alignment with the feed and return rails. The typical rails of such systems were also notched to permit transfer of carts using means such slots or ramps. In operation, cart or cart and pallet transfer is typically accomplished in such systems by the cart dropping from the feed rails to the return rails or rolling down ramps to accommodate the wheels of the carts between the feed and the return rails. Some such systems utilize pulley and other means as part of the means to effectuate transfer.

Some users of such systems may desire potentially simpler, smoother operation in certain storage situations. Easier manufacture and assembly of the components of such systems may also be desired, along with less wear and tear on the components of the system and, particularly, the wheels and assemblies of the carts. The present invention is also believed to be advantageous in certain applications, such as where the use of carts is not required or desired, to have a transfer and return system that can operate without the use of wheeled carts. For example, it may be desired to be able to transfer pallets, slip sheets, unit load and the like without the need for carts.

SUMMARY OF THE INVENTION

The present inventions preserve the advantages of known pushback rack and other pallet rack storage systems, including those associated with the transfer and return systems described in the Konstant '896 patent and Konstant patent application. In addition, the present inventions provide new advantages and efficiencies over the known systems.

Therefore, an object of the present invention is to provide a load transfer and cart or pallet return storage system where unloaded, wheeled carts, wheeled carts and unloaded pallets or unloaded pallets, slip sheets, unit load and the like are selectively and automatically returned from an unloading end to a loading end without the operator having to physically remove the cart or pallet to accomplish the return of carts and/or pallets to a reloading position or aisle.

Another object of the present invention is to provide a transfers and return storage system that automatically transfer unloaded carts and/or pallets from an unloading end and returns them to a loading end where they may be conveniently stored, repositioned or re-used.

An additional object of the present invention is to provide a system where the return of unloaded carts and/or pallets is selectively accomplished through an easily operable, smooth and convenient transfer mechanisms.

A further object of the present invention is to provide a system having carts with wheels that may be equally spaced on opposing sides of the cart that operate in rolling relation to an upper pair of rails and are capable of automatic transfer to a rolling relation with a lower pair of rails.

Still another object of the present invention is to provide a system having carts that do not require guide means and are of more standard or universal construction.

Still a further object of the present invention is to provide transfer means or mechanisms for the automatic return of unloaded carts and/or pallets to a loading end without interfering with the rolling relationship and/or lateral alignment of the carts or pallets on the upper or lower pair of rails.

Still an additional object of the present invention is to provide a smooth, effective and simple release means or mechanism to selectively release the carts and/or pallets for storage, transfer and return.

Yet another object of the present invention is to be able to use flow rails.

Yet an additional object of the present invention is to provide systems that can be used in combination with multiple rack systems, that can be used in conjunction with other types of pallet storage systems, and that can store carts or pallets and their loads in multiple deep positions.

Yet a further object of the present invention is to provide an improved system that offers potentially smoother operation in certain applications, and reduced installation and manufacturing time and costs, with less wear and tear on the system's components.

Still yet another object of the present invention is to provide transfer and return systems that can be used with pallets, slip sheets, unit loads and the like without the need for wheeled carts.

In accordance with the present inventions, a load transfer and cart return storage system is provided having a two-level rail system, carts with wheels for suitable rolling relation to each of the rail systems, a transfer means or mechanism and a cart release means or assembly. The rail system includes at least one pair of spaced, parallel feed rails and at least one pair of spaced, parallel return rails. The feed rails and return rails each have an unloading (front) end, a loading (rear) end and a rolling surface. The return rails are positioned and operable below the feed rails.

At least one cart having wheels which may be equally spaced from the sides of the cart is provided which is capable of rolling engagement with the rolling surface of the feed rails and which is capable of being automatically transferred to rolling engagement with the rolling surface of the return rails.

Also in accordance with the present invention, a load transfer and return storage system is provided having a two-level rail system, a transfer means or mechanism and a load or pallet release means or assembly. The rail system includes at least one pair of spaced, parallel feed flow rails and at least one pair of spaced, parallel return flow rails. The feed and return flow rails are provided with wheels along their length that form a relatively continuous line of wheels acting as rolling surfaces. The feed and return flow rails each have an unloading (front) end, and a loading (rear) end. The return flow rails are positioned and operable below the feed flow rails.

The feed and return flow rails are spaced and sized to accommodate at least one pallet on the rolling surfaces formed by the line of wheels. The pallet, slip sheet, unit load and the like (hereinafter "pallet") are capable of being selectively and automatically transferred from engagement with the rolling surface of the feed flow rails to engagement with the rolling surface of the return flow rails.

The present inventions further include transfer means and mechanisms which enable the cart, cart and pallet or pallet to be automatically and smoothly transferred from the unloading end of the feed rails or feed flow rails to rolling engagement with the return rails or return flow rails. Transfer may be accomplished through operation of a transfer rail or transfer flow rail system without interfering with the alignment or smooth operation of the cart, cart and pallet or pallet on the feed and return or feed and return flow rails. A release means or assembly is also provided which permits the selective movement of carts along the feed rails or pallets along the feed flow rails for storage and transfer, when desired, to the return rails or return flow rails.

The feed or feed flow rails are sloped upwardly from the front end to the rear end at a gradual angle and the return or return flow rails are sloped downwardly from the front end to the rear end at a gradual angle. The upward slope of the feed or feed flow rails permits the smooth flow of loaded carts or pallets to the unloading end for storage and/or unloading. Thus, in operation, a loaded cart and/or pallet is permitted to advance to a stored or unloading position at the front aisle of the system. After the cart or pallet has been unloaded and transfer selectively initiated, the cart, cart and pallet or pallet are automatically transferred from the feed or feed flow rails to rolling engagement with the return rails or return flow rails by operation of the transfer means. The downward slope of the transfer means and return or return flow rails then permits the smooth transfer of the carts from the transfer rail or transfer flow rail and onto the return rails or return flow rails to the loading end where the carts, carts and pallets or pallets may be repositioned on the rear end of the feed or feed flow rails or stored for later use. The cart release mechanism may then be activated to permit any subsequent loaded cart or loaded pallet to assume a stored or unloading position.

BRIEF DESCRIPTION OF THE DRAWINGS

These and other features, objects and advantages of the present invention will become apparent from the following description and drawings wherein like reference numerals represent like elements in the several views, and in which:

FIG. 9 is a top plan view of the system of the present invention shown in FIG. 8 having an additional flow rail to provide additional support for a pallet;

FIG. 10 are side perspective views of embodiments of the flow rails of the present invention;

FIG. 11 is a perspective view of another embodiment of the present invention shown in a loaded, unloading or stored position;

DETAILED DESCRIPTION OF THE PREFERRED EMBODIMENTS

Figure 1:
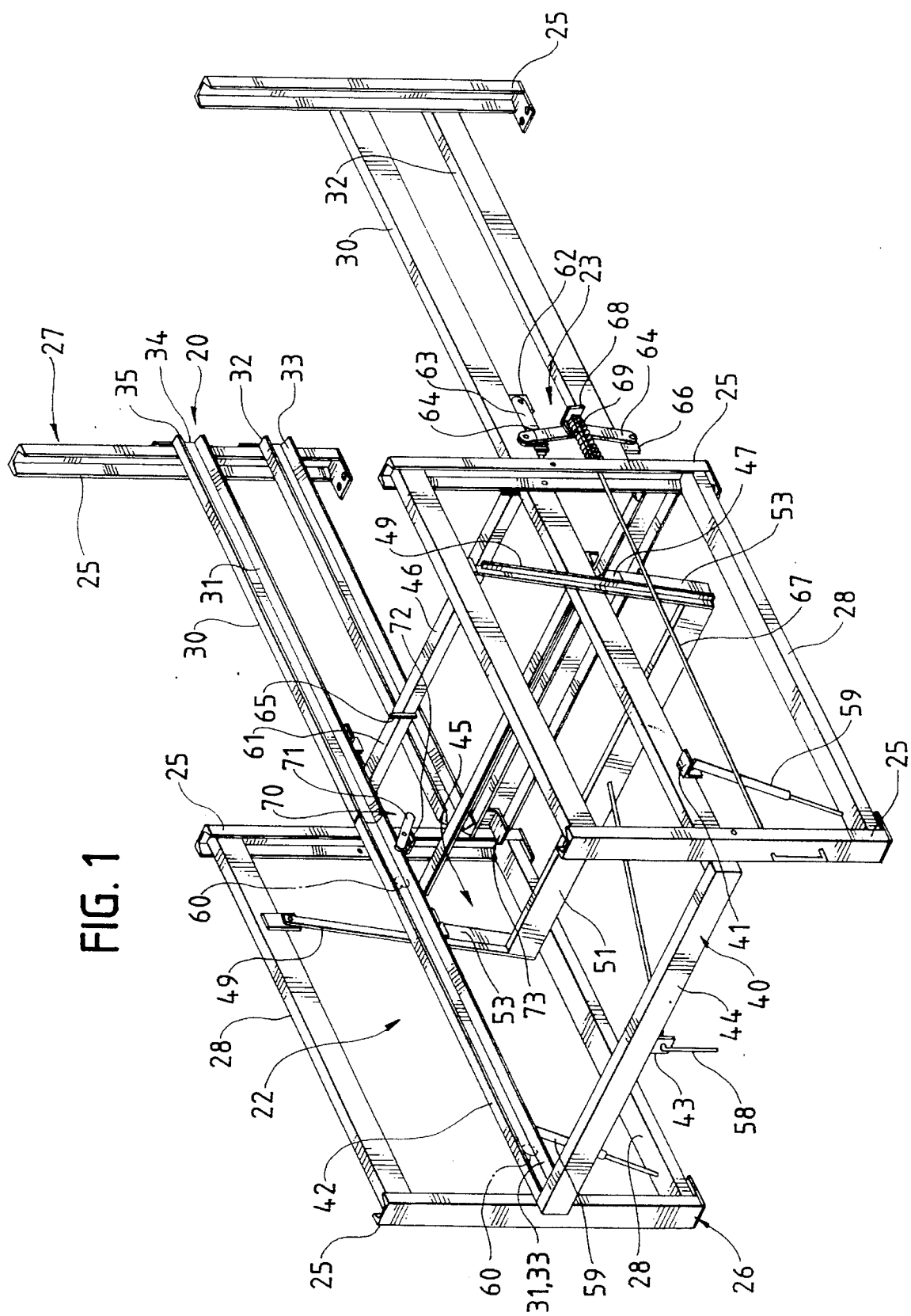
FIG. 1 is a perspective view of a preferred embodiment of the present invention shown with the feed rails, transfer and release mechanisms in a stored, loaded or unloading position.
Figure 1A:
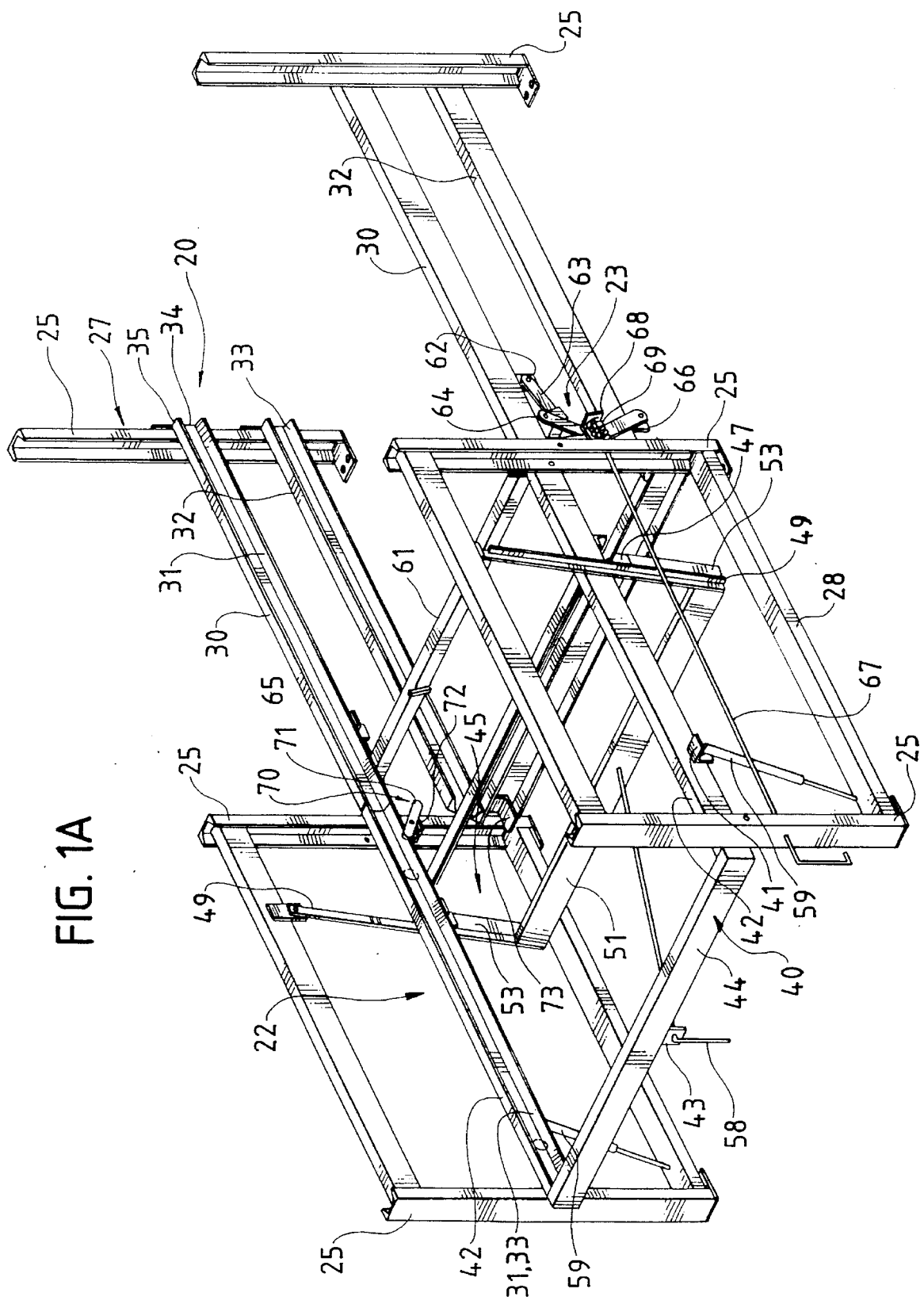
FIG. 1A is a perspective view of a preferred embodiment of the present invention shown with the feed rails and transfer means in a stored, loaded or unloading position and the cart release means in an unlocked or release position.
Figure 2:
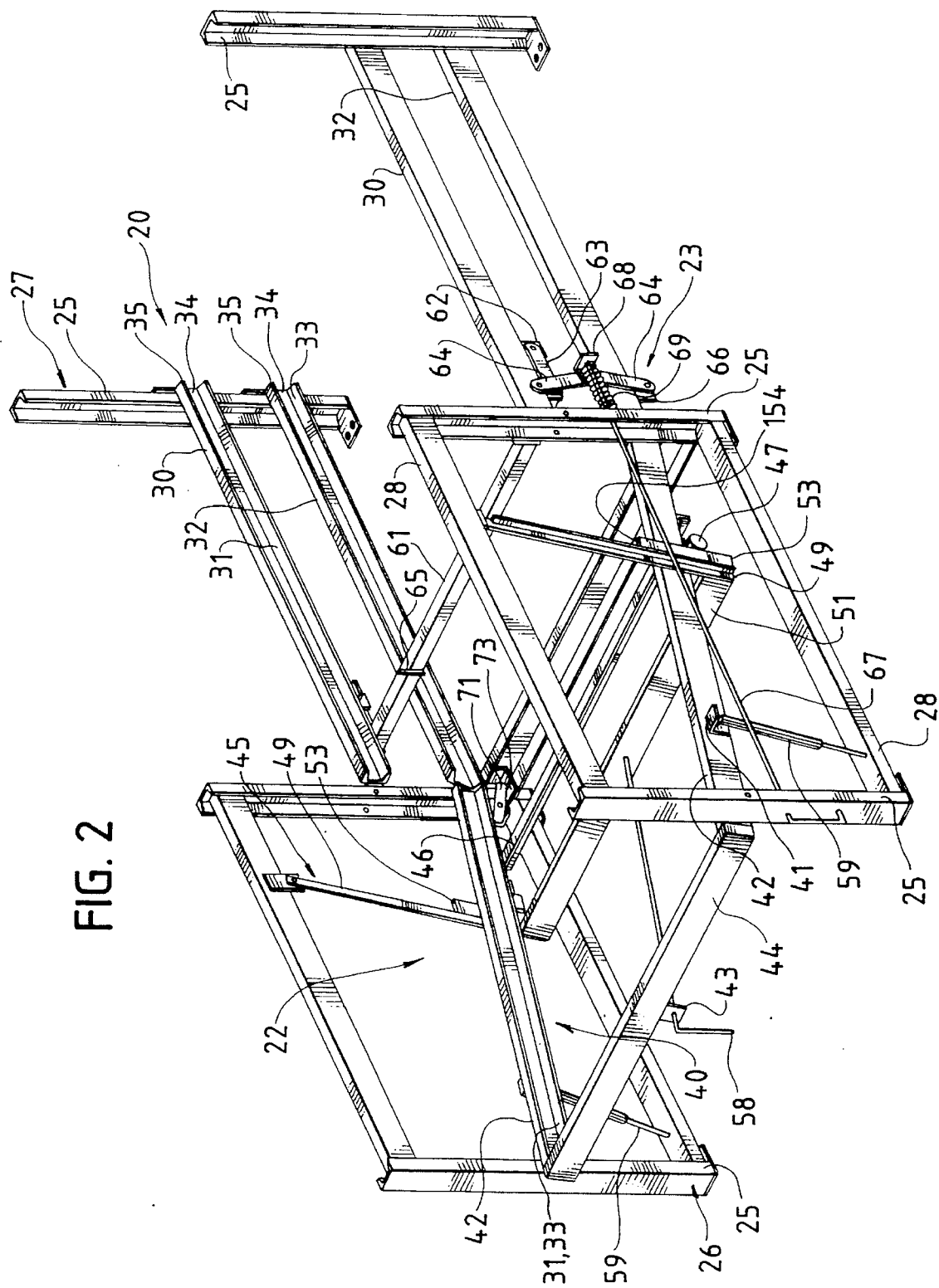
FIG. 2 is a perspective view of a preferred embodiment of the present invention shown with the feed rails and transfer mechanisms in a transferred, or return position and the cart release mechanism in a locked position.

The load transfer and return systems of a preferred embodiment of the present inventions are shown generally in FIGS. 1–4. A two-level rail system 20; a cart assembly (FIG. 6) having wheels and designed to carry a pallet and support a load shown generally as 21; a transfer means shown generally as 22; and, a cart release assembly shown generally as 23 are provided.

The rail system 20 is typically supported by columns 25 and beams 28 forming storage bays that are in turn part of an overall support structure (not shown). Rail system 20 may be connected to columns 25 by brackets or other well known means (not shown). The load transfer and return storage systems of the present inventions may be stacked one on top of another as part of a rack structure (not shown), installed in side-by-side relationship within a single storage bay (not shown), or installed in a side-by-side relationship in adjacent storage bays (not shown). As used herein, and as shown on FIG. 1, front or forward end 26 generally refers to an unloading or storage end which is generally associated with an aisle for workers and equipment to unload the carts and/or pallets (not shown). The rear or rearward end 27, as used herein, refers to a loading or return end which is also generally associated with an aisle for workers and equipment used in loading or reloading the carts 21 and pallets (not shown).

Rail system 20 consists of at least one pair of spaced, parallel feed rails 30 and at least one pair of spaced, parallel return rails 32. The paired rails are mirror images of each other. Feed rails 30 are positioned above return rails 32 and are sloped upwardly from the forward end 26 to the rear end 27 at a gradual angle. Return rails 32 are sloped downwardly from the forward end 26 to the rear end 27 at a gradual angle. The forward ends of each of the pairs of rails terminate before the front end 26 of the rail systems in order to accommodate a switch rail system 40 or other transfer means 22 to effectuate smooth transfer of carts or carts and pallets. Switch rail system 40 may be pivotally connected to the front end 26 of the overall rack system through columns 25. Alternatively, a front aisle beam 29 (see, e.g., FIG. 11) may be provided which may be used to support the pivot end of switch rail system 40 or the components of the transfer system 22. As shown in FIGS. 1, 2, 11 and 13, switch rail 42 is essentially a continuation of feed rails 30 when in an unloading or stored position (FIGS. 1 and 11). When in a transfer mode or position, the rear ends of switch rail 42 ramp downwards towards and align with return rails 32 (FIGS. 2 and 13) to enable smooth transfer of carts 21.

Feed rails 30 have rolling surfaces 31 and return rails 32 have rolling surfaces 33, which may be formed by flange portions 35. Web portions 34 of the feed and return rails 30 and 32 provide support and rigidity to the rail system 20 and may also be used to help secure rail system 20 to columns 25. Flange portions 35 of rails 30 and 32, in conjunction with web portions 34, also serve to keep the carts 21 in proper alignment and protect the rolling surfaces 31 and 33 from accumulating debris. It will be understood by those of ordinary skill in the art that although channel members are shown for the feed, return and switch rails 30, 32 and 42, in a preferred embodiment, other structural members having different cross-sectional shapes may be employed. It will also be understood that the carts 21 may ride on different rolling surfaces of said rails consistent with the goals of the present inventions. For example, if desired, carts 21 may be designed to ride on the upper flange portion 35 of the feed and return rails 30 and 32.

Figure 6:
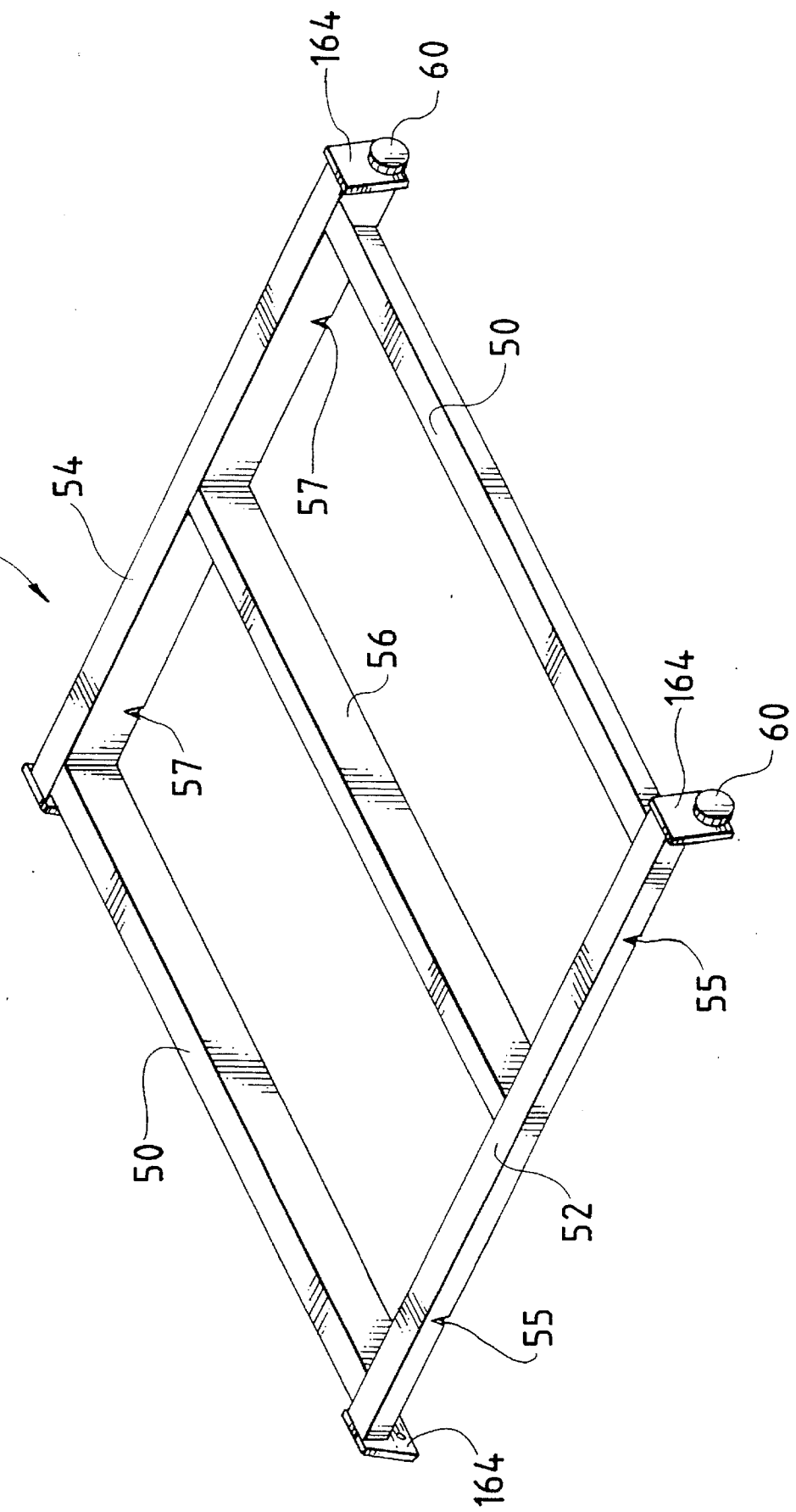
FIG. 6 is a side perspective view of a cart of the present invention.

Details of the cart assembly 21 of a preferred embodiment of the present inventions, may be seen with reference to FIG. 6. Cart assembly 21 consists of side members 50, cross members 52 and 54, and any additional number of support members 56 that may be necessary to support the desired load. Side members 50 are secured to cross members 52 and 54, which together form the load bearing surface of cart 21. Typically, a pallet and its associated load would be placed on the load bearing surface of cart 21. A plurality of wheels 60 are provided and may be rotatably mounted to the ends of cross members 52 by brackets 164 or other suitable means well known to those of ordinary skill in the art.

Figure 7:
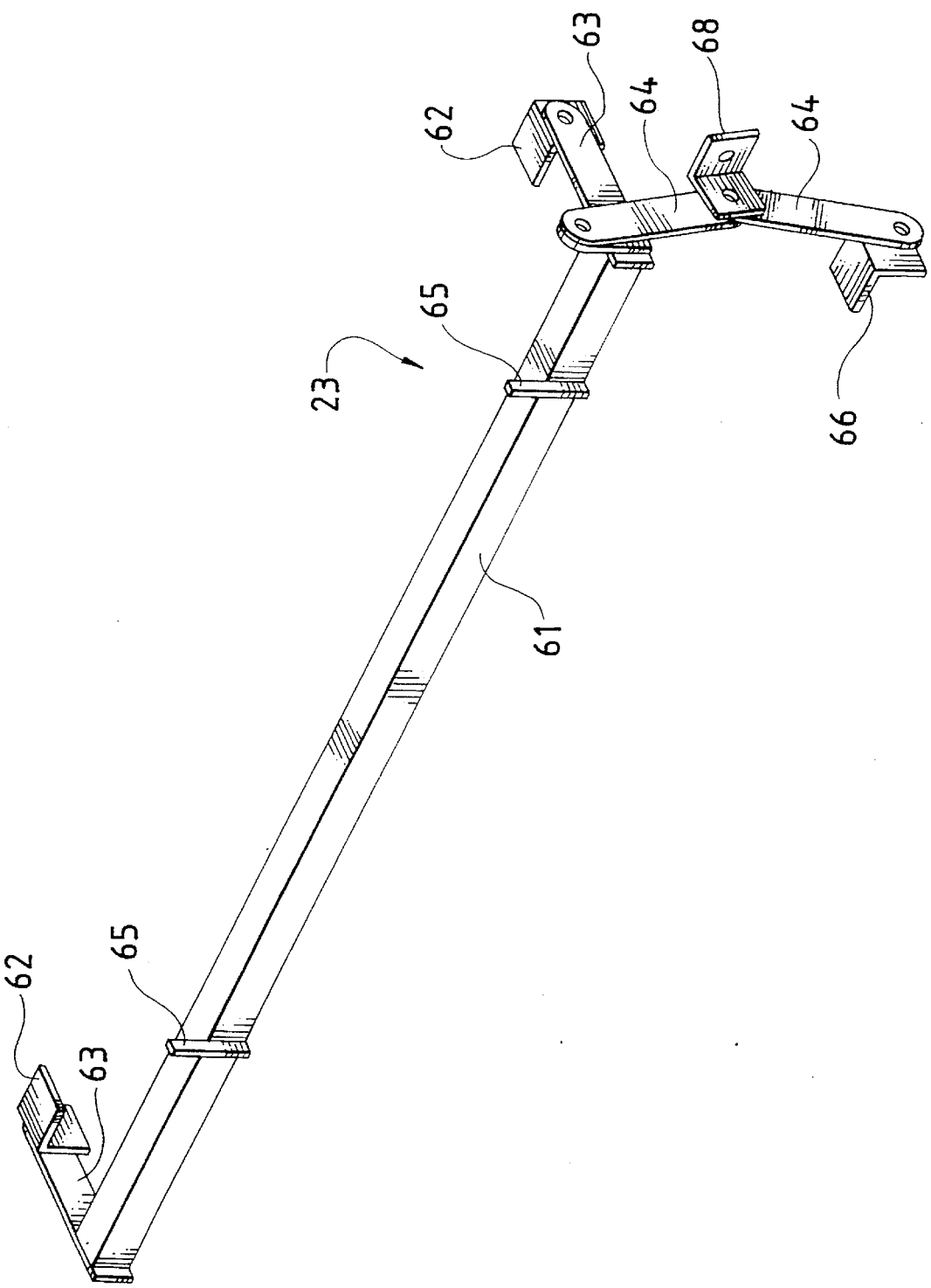
FIG. 7 is a side perspective view of the components of a cart release means of the present invention.

Cross member 52 and 54 of cart 21 is provided with slots 55 which are designed and located to cooperate with the cart release assembly 23 as hereinafter described (FIG. 7). Similarly, cross member 54 is provided with slots 57 that are asymmetrical to the slots 55 spaced along cross member 52. It will be understood, particularly by reference to FIG. 6, that because of the asymmetrical or off-center placement of slots 57 on cross member 54 in relation to slots 55 on cross member 52, that the slots of cart 21 will be in the same orientation relative to the front end 26 of the rail system 20 with either cross member 52 toward the front end 26 of the system or cross member 54 toward the front end 26 of the system. In this manner, the cart 21 may be used in either direction from or along feed rails 30 to the switch rail system 40 and controlled by cart release assembly 23 as hereinafter described.

In a preferred embodiment of the present invention, a switch rail system 40 is provided as the transfer means 22. With reference to FIG. 5, the switch rail system 40 has a pair of spaced, parallel switch rails 42 each having rolling surfaces 31 and 33 to accommodate the wheels 60 of the carts 21 in rolling relation to the switch rails 42. A front cross member 44 is also provided as well as a stiffening member 46. Switch rail system 40 is pivotably mounted at its front end 26 to columns 25 at a point where feed rails 30 would terminate if continued to the frontmost end 26 of the system (see, e.g., FIGS. 3 and 4). A pair of transfer wheels 47 are provided which are rotatably mounted to opposing switch rails 42 by means of a bracket 48, or other well known means.

Figure 3:
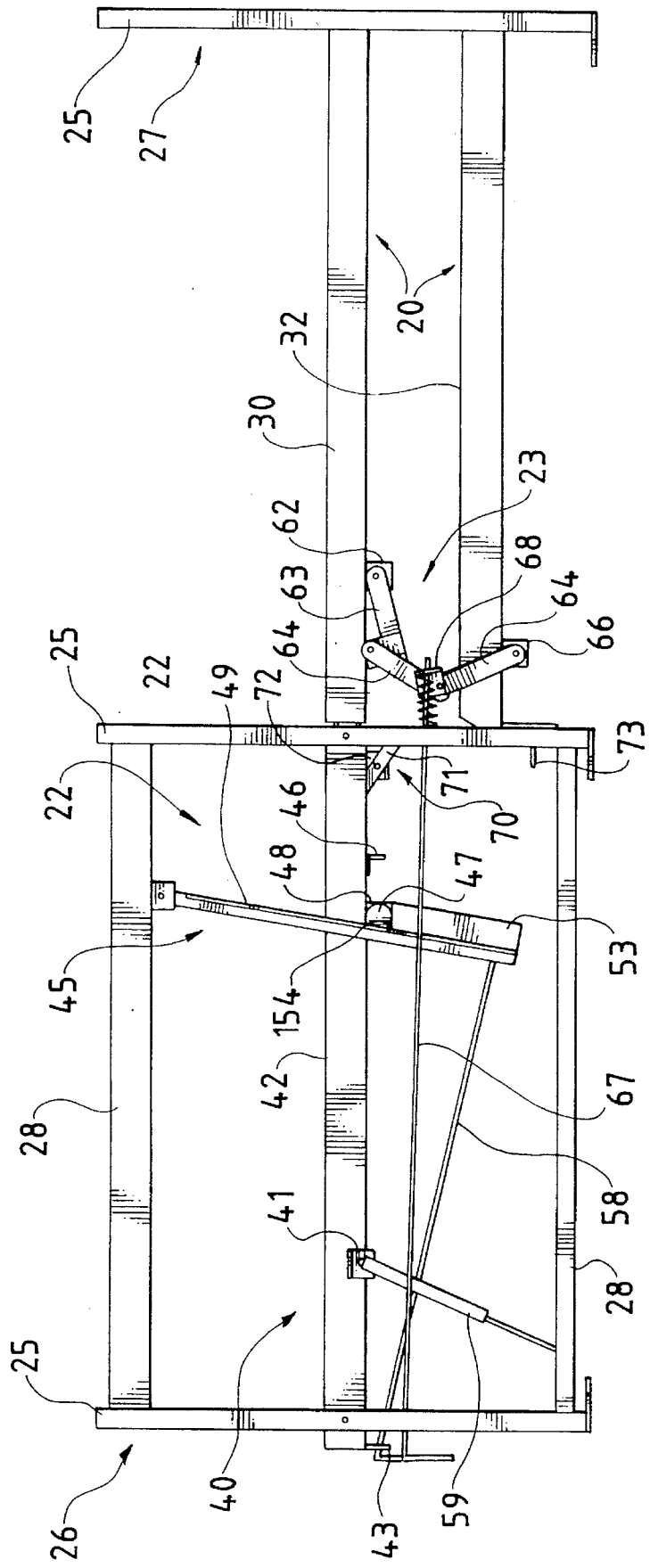
FIG. 3 is a side elevational view of a right-hand portion of a system of the embodiment of the present invention as shown in FIG. 1A with the transfer means in a stored or loaded position, and the cart release mechanism in an activated, released or unlocked position.
Figure 4:
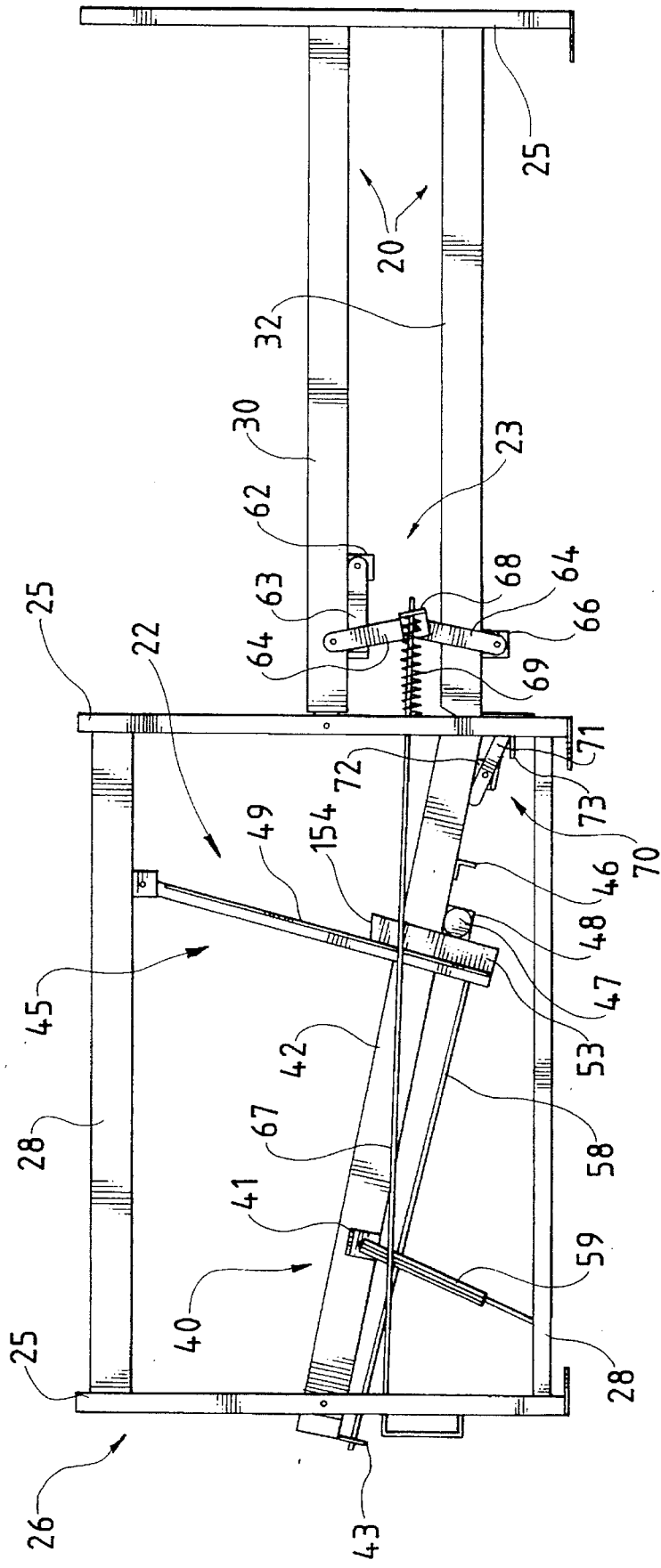
FIG. 4 is a side elevational view of a right-hand portion of a system of the present invention as shown in FIG. 2 with the transfer means in a transfer or return position and the cart release mechanism in a locked or inactivated position.

With reference to FIGS. 1, 1A, 3, 4 and 4A, switch rail system 40 further provides a swing support member 45 which acts as support for the rearward end 27 of switch rail system 40 and also permits switch rail system 40 to assume a transfer position, when desired (see, e.g., FIG. 4). It will be understood by those of ordinary skill in the art that swing support member 45 is of sufficient strength to support the loads contemplated by the users of such systems.

Swing support 45 consists of two side members 49 and a cross member 51. The upper end of each side member 49 is pivotably mounted to beam 28, again by a bracket or other well known means. Each side member 49 is also provided with a pedestal 53, the upper end of which forms a shelf 154 designed to engage switch wheel 47 when in a stored or unloading position. The top of shelf 154 is slightly angled to assist in ease of transfer as hereinafter described. A switch release 58 is also provided, the rearward end of which is secured to cross member 51 of swing support 45. The front end of switch release handle 58 passes slidably through a bracket 43 of front cross member 44. At least one gas spring 59 is provided to retard or dampen movement of switch rail system 40 during transfer. Gas springs or shocks 59 also serve to return switch rail system 40 to the stored or unloading position after completing transfer.

Gas springs 59 may be connected at one end to bracket 41 of switch rails 42 of switch rail system 40 and at its other end to beam 28. It will be understood by those of ordinary skill in the art that springs or other devices (not shown) may be used in place of shocks. It will also be understood that the shocks 59 or other dampening mechanisms may be connected between an upper beam 28 and switch rail 42, and that more than one such device may be employed.

The general operation of transfer means 22 may be seen by reference to FIGS. 3 and 4. A cart 21 and its load (not shown) is released by means hereinafter described to travel down feed rails 30 to an unloading or stored position on switch rails 42. It will be understood by those of ordinary skill in the art that switch rail system 40 is large enough for a cart 21 to fit entirely on the assembly so that transfer may be accomplished (see, e.g., cart wheels 60 shown on FIG. 1). When the load has been removed from the cart 21 on the switch rail system 40, transfer activation or switch release 58 may be pulled forward or activated. As a result, swing support 45 is urged forward or rotated permitting transfer wheels 47 of switch rail 42 to disengage from support shelf 154 and roll along the face of pedestal 53 to the position shown, for example, in FIG. 4. As indicated, the movement of switch rail system 40 is dampened by gas springs 59. Cart 21 (not shown) may then roll onto return rails 32. After cart 21 has cleared switch rail system 40, gas spring 59 urges switch rail 42 upward to assume the position shown, for example, in FIG. 3, whereby the transfer wheels 47 roll up along the face of pedestal 53 to re-engage with support shelf 154 in a locked and stored position. Support shelf 154 is angled slightly for ease of transfer operation and to ensure that the system will remain in a stored position. For additional ease of operation, swing support 45 may be positioned at a slight angle when in the stored or unloading position so that the forces of gravity will aid in the release and return (FIG. 3). The transfer wheels 47 are further provided for ease of operation. However, it will be understood by those of ordinary skill in the art that other means, such as teflon pads, may be used in place of transfer wheels 47 and that additional springs or shocks may be used to aid in transfer and return.

A cart stop assembly 70 is also provided on or as part of switch rail system 40 to ensure that the cart 21 does not derail during transfer. In a preferred embodiment of the cart stop assembly 70 (see, e.g., FIG. 5), a cart stop lever 71 is provided which is pivotably mounted to a bracket 72 to at least one switch rail 42. Cart stop lever 71 is longer from its pivot point toward the rearward end 27 than it is from its pivot point to its forward end 26. In this manner, gravity will keep lever 71 in a locked position as shown generally in FIG. 5 (see also FIGS. 1, 1A, 3 and 4A). When in this position, the upper portion of lever 71 permits a cart 21 to pass over it without obstruction. Once the cart 21 passes cart stop assembly 70, the upper portion of lever 71 engages bracket 64 and/or axle (not shown) or frame of the cart.

Figure 4A:
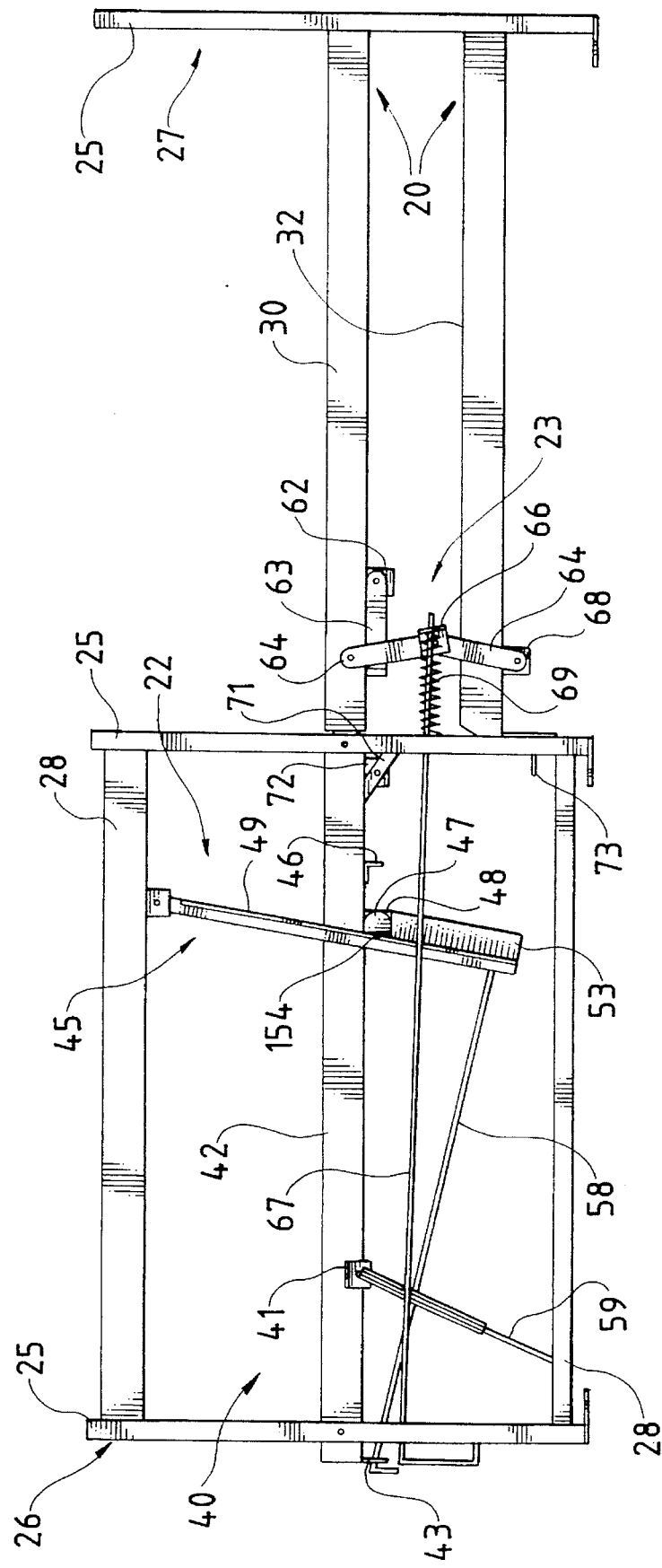
FIG. 4A is a side elevational view of a right-hand portion of a system of the present invention as shown in FIG. 1 with the feed rails, transfer and cart release means in a stored, loaded or unloading position.
Figure 5:
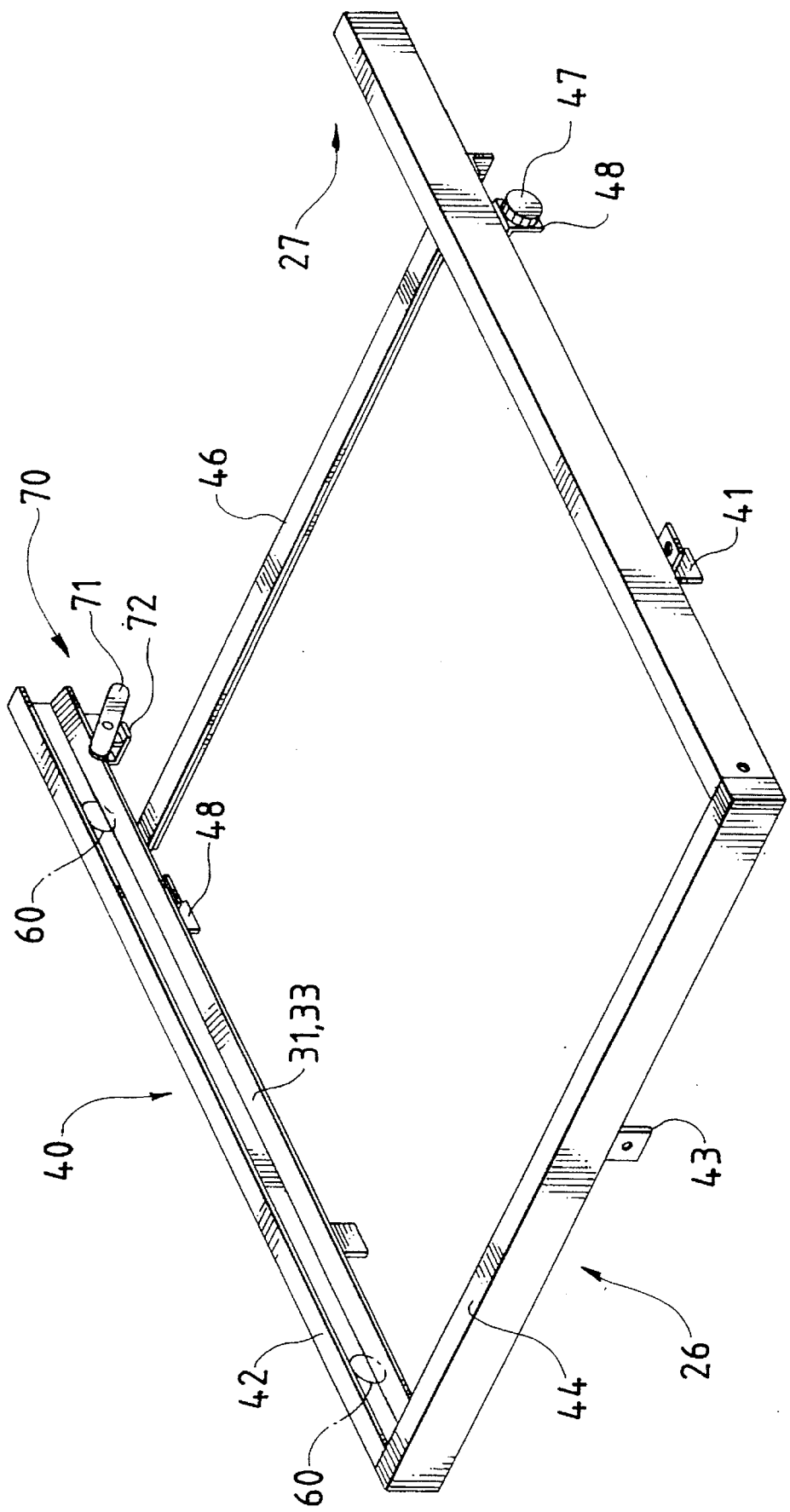
FIG. 5 is a side perspective view of a transfer mechanism of the present invention.

Thus, when transfer is initiated, cart stop assembly 70, through lever 71, prohibits the cart 21 from rolling off of switch rails 42 and derailing prior to complete movement of switch rail system 40. When switch rail assembly 40 is in its full transfer position (FIG. 4), the rearward (longer) end of lever 71 engages a bracket or other means 73 (FIG. 4) that causes the front end of lever 71 to pivot downward and release cart 21 for flow to the return rails 32. Upon return of the switch rail system 40 to a stored position, gravity forces the longer (rearward) end of lever 71 downward and assumes a cart stop position (FIG. 4A). In this manner, cart 21 may freely move to engagement with switch rail system 40, be stopped from derailing during transfer and automatically be released to the return rail 32.

Selective cart release means 23 is also provided that keeps at least one cart 21 and its load from rolling forward along feed rails 30 while transfer is occurring. In a preferred embodiment of the cart release mechanism 23 (FIG. 7), a bar 61 is provided that is pivotably mounted at each end to feed rails 30 by links 63 and brackets 62 or other well known means. At least one protrusion 65 is provided that is designed to engage cross member 52 (or alternatively cross member 54) of cart 21 to prevent the cart from advancing or rolling forward. Cart release 23 is also provided with a pair of interconnected and pivotable links 64, the upper end of which is pivotably connected to bar 61 or link 63, and the lower end of which is pivotably mounted to return rails 32 by a bracket 66, or other well known means. A cart release activation mechanism 67 is provided that is connected at its rearward end 27 to a bracket 68 that is pivotably mounted to links 64. Cart release mechanism 67 passes through column 25 and forms a handle at the forward end 26. A spring 69 is also provided and is mounted between column 25 and bracket 68 which acts to bias and return cart release assembly 23 into a locked position.

In the operation of cart release assembly 23, a cart 21 rolls down feed rails 30. Cross member 52 engages protrusion 65 and cart 21 is stopped. Upon activation of cart release assembly 23, bar 61 is rotated downward an amount sufficient to permit cross member 52 of cart 21 to clear protrusion 65 and roll forward and along feed rails 30 to switch rails 42. Cart release assembly 23 may then be returned to its locked position and the cross member 54 of cart 21 may continue to roll forward because slots 57 are aligned with protrusion 65. Once the cart and its load is in the unloading or stored position, any subsequent cart is kept on feed rails 30 by protrusion 65 of cart release assembly 23.

The overall operation of a preferred embodiment of the present invention may be seen by reference to FIGS. 1 through 4. A pallet and load is placed upon cart 21 (not shown) which is placed in rolling engagement with feed rails 30. The forward slope of feed rails 30 causes cart 21 to travel forward along feed rails 30 until front cross member 52 of cart 21 is engaged by protrusion 65 of cart release mechanism 23. Activation of cart release mechanism 23 permits the cart 21 to travel unobstructed by cart stop assembly 70 to its stored position along switch rail system 40 (see FIGS. 3, 4 and 4A). A second or more loaded carts may be similarly placed in rolling engagement with feed rails 30 behind cart assembly 21 for additional storage. When desired, the load is removed from cart assembly 21 that is in the stored or unloaded position. Thereafter, cart assembly 21 and its associated pallet may be transferred to the return rails 32 by activation of cart release mechanism 23 (see FIGS. 1A and 3).

Upon activation of transfer mechanism 22, the rearward end 27 of switch rail system 40 lowers to its transfer position using the weight of cart 21. During this process, lever 71 of cart stop 70 engages cart 21 and prohibits it from moving off of switch rails 42. When transfer system 40 is in its full transfer position, cart stop 70 automatically disengages and permits cart 21 to engage return rails 32. Switch rail system 40 is then pushed or biased upward into the stored position by shocks 59 so that transfer wheels 47 of swing support 45 rest again on edge 154 of pedestal 53. Switch rail system 40 is then ready to receive a subsequent cart 21 which is released through activation of release mechanism 23.

In this manner, the unloading of stored products may take place in a single aisle. All loading of the carts 21 is done from a single rear aisle. Because of the automatic transfer and return feature, the unloading operator does not have to remove carts 21 or pallets (not shown) from the system while in the unloading aisle and thus obstruct or slow down the unloading process. Unloaded carts 21 and pallets are automatically returned to the loading end for subsequent use.

Figure 8:
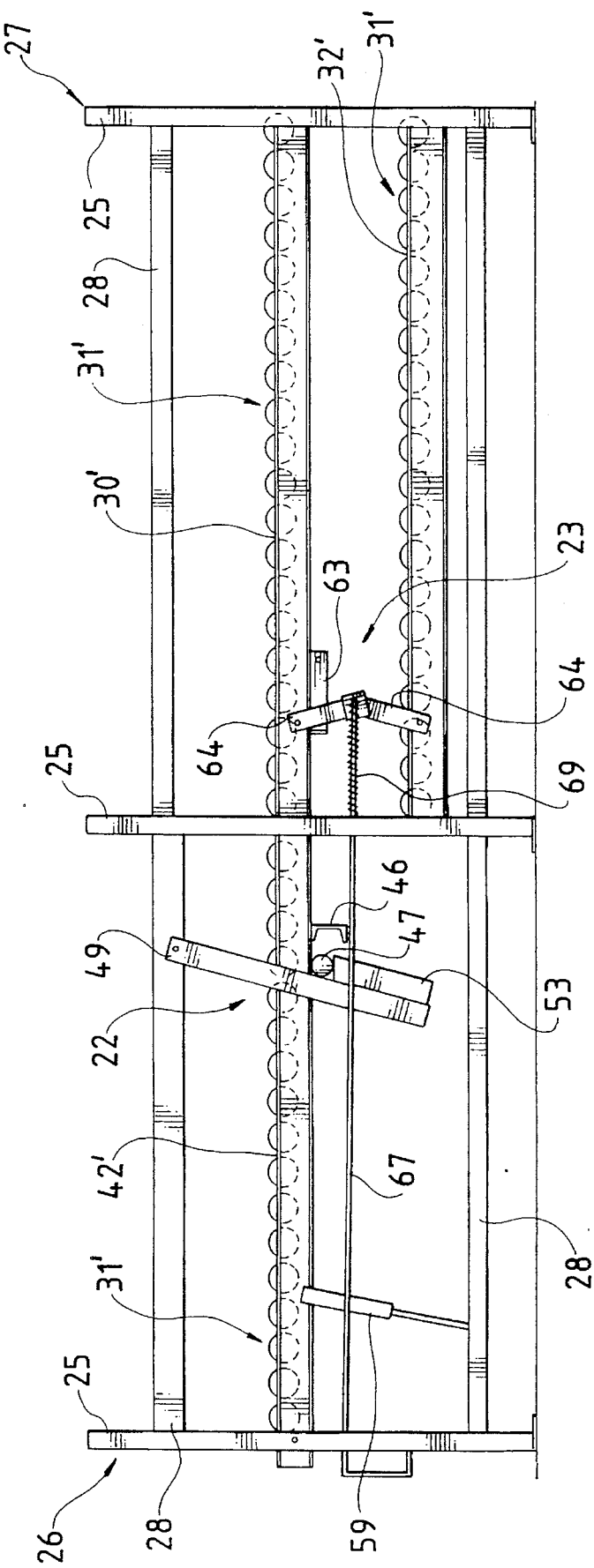
FIG. 8 is a side elevational view of another preferred embodiment of the present invention having feed flow rails and return flow rails for operation without a cart.

In FIGS. 8 through 10, another preferred embodiment of the present inventions is shown. Specifically, a system that does not require the use of carts is provided. In this embodiment, feed rails 30, return rails 32 and switch rails 42 are replaced with flow rails 80 that are shown generally in FIG. 10 and designated as 30', 31', 32', and 42', respectively in FIGS. 8 and 9. Rolling surfaces 31[1] are formed from a series of in-line wheels that permit a pallet and its load to roll along the rolling surfaces 31'. Other than the substitution of feed flow rails, return flow rails 32' and switch flow rails 42', the structure and operation of this embodiment is substantially identical to that shown in the other embodiments discussed herein.

As shown in FIG. 9, additional flow rails 83 may be provided for the pairs of rails to give additional support to the pallet, if necessary or desired. In addition, rolling retarders 81 may be provided on the feed and/or return flow rails to slow the movement of pallets or pallets and their loads along the rails. Such retarders (see FIGS. 9 and 10) are particularly useful in multiple deep situations having relatively long feed and return rails. Similar rolling retarders or brake mechanisms may also be provided for slowing carts in multiple depth systems for load transfer (not shown).

Figure 12:
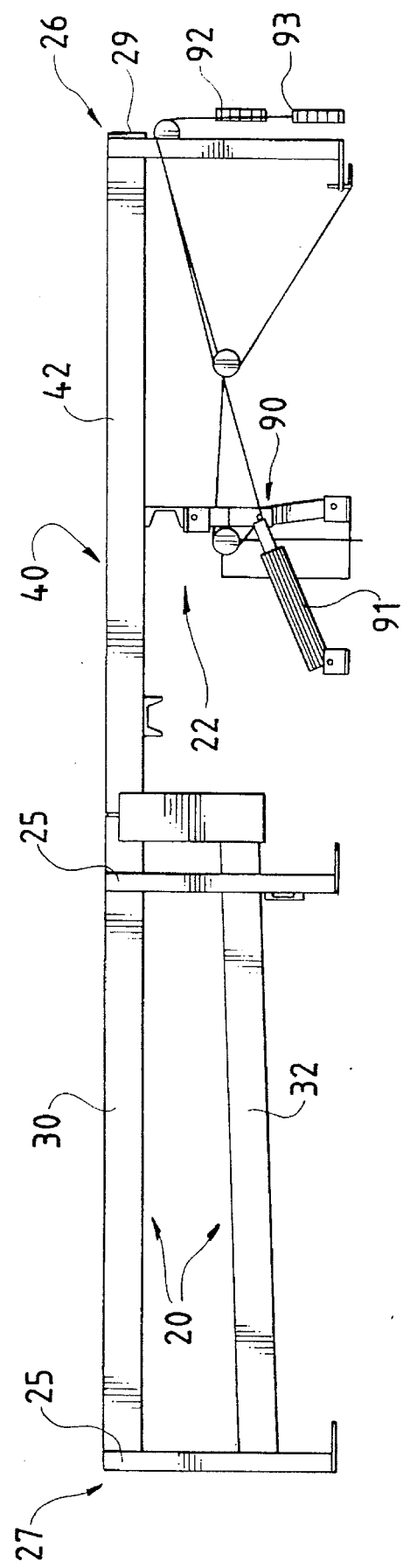
FIG. 12 is a side elevational view of the left-hand side of the present invention of the alternate embodiment shown in FIG. 11.
Figure 13:
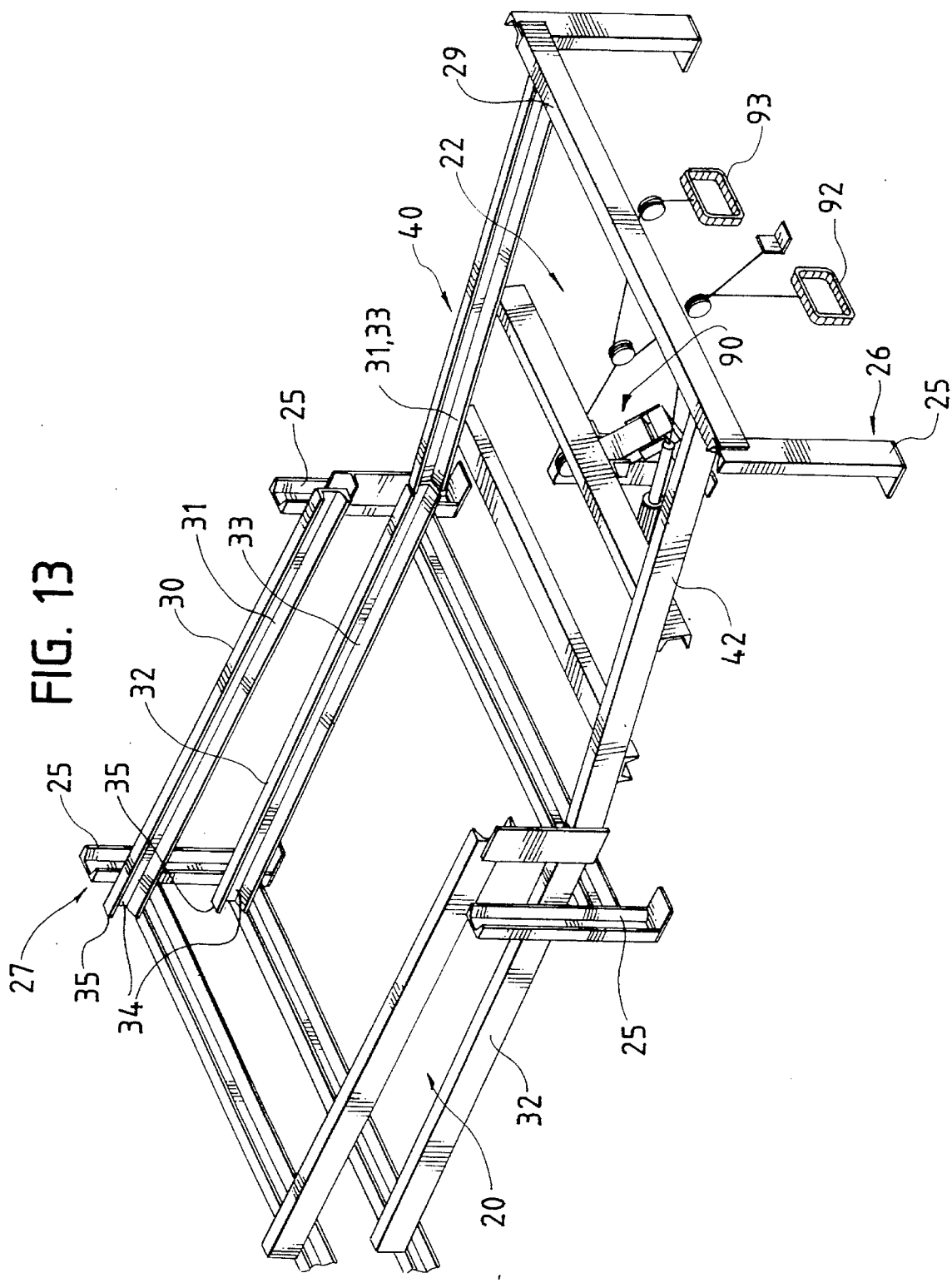
FIG. 13 is a perspective view of the present invention of the alternate embodiment shown in FIG. 11 in a transfer or return position.
Figure 14:
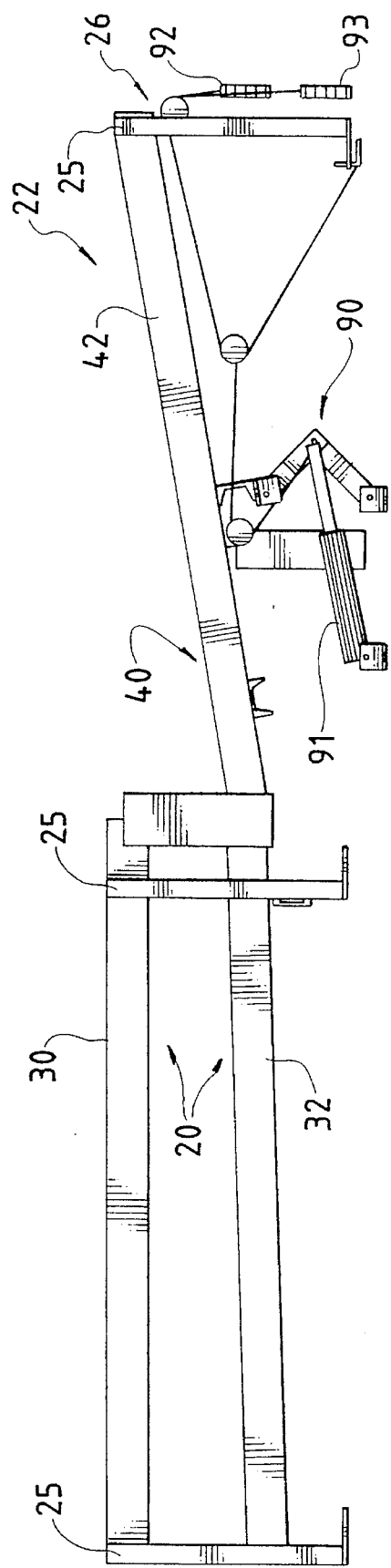
FIG. 14 is a side elevational view of the left-hand side of the present invention of the alternate embodiment shown in FIG. 13 shown in a transfer or return position.

Yet another embodiment of the present inventions is shown in FIGS. 11 through 14. This embodiment of the system is identical to a preferred embodiment as shown in FIGS. 1 through 8, except for the transfer means 22. In this embodiment, transfer means 22 consists of an articulated arm assembly 90, a gas spring or shock or other dampening means 91 and activation handles 92 and 93. In operation, handle 92 is activated pulling articulated arm assembly 90 forward and permitting the rear end of switch rails 42 to move downwardly to engagement with return rails 32. Handle 93 may then be activated and the switch rail system 40 returned with the aid of shock 91 to its loaded or stored position as shown in FIGS. 11 and 12. Cart stop assemblies and cart advance release mechanisms may also be provided (not shown).

While preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A load transfer and return system comprising:
   at least one pair of spaced, parallel feed rails having rolling surfaces;
   at least one pair of spaced, parallel return rails having rolling surfaces and positioned below said feed rails;
   at least one cart having wheels for rolling engagement with said rolling surfaces of said feed rails and said return rails;
   a pivotable switch rail assembly to selectively transfer said cart from said feed rails to said return rails;
   a transfer activation mechanism to enable the selective operation of said switch rail assembly and effectuate transfer of said cart from said feeds rails to said return rails;
   a cart advance mechanism to enable the selective release of said cart from said feed rails to an unloading or transfer position on said switch rail assembly; and,
   a cart stop device on said switch rail assembly to prevent cart derailment during said transfer of said cart from said feed rails to said return rails, wherein said cart stop device automatically disengages said cart upon said switch rail assembly achieving a full transfer position and automatically returns to an operative position upon completion of transfer of said cart from said feed rails to said return rails.

2. The invention of claim 1 wherein said switch rail assembly includes gas springs to dampen movement of said switch rail assembly during transfer and to return said switch rail assembly to a stored or unloading position after transfer.

3. The invention of claim 2 wherein said cart includes notches to cooperate with said cart advance mechanism.

4. The invention of claim 1 wherein said pivotal switch rail assembly includes a swing support.

5. The invention of claim 4 wherein said swing support includes at least one pedestal to cooperate with at least one transfer wheel included on said switch rails.

6. The invention of claim 1 wherein said load transfer and return system is incorporated into an overall storage system using, in combination, other types of rack storage systems.

7. A load transfer and pallet or slip sheet return system comprising:
   at least one pair of spaced, parallel feed flow rails;
   at least one pair of spaced, parallel return flow rails;
   a pivotable switch flow rail assembly to selectively transfer a pallet or slip sheet from said feed flow rails to said return flow rails;
   a transfer activation mechanism to enable the selective operation of said switch flow rail assembly and effectuate transfer of pallets or slip sheets from said feed flow rails to said return flow rails;
   a stop device to prevent pallet or slip sheet derailment or misalignment during transfer of a pallet or slip sheet wherein said stop device automatically disengages said pallet or slip sheet upon said switch flow rail assembly achieving a full transfer position and automatically returns to an operative position upon completion of transfer.

8. The invention of claim 7 wherein said switch flow rail assembly includes gas springs to dampen movement of said switch rail assembly during transfer and to return said switch flow rail assembly to a stored or unloading position after transfer.

9. The invention of claim 7 wherein a pallet advance mechanism is provided to enable the selective release of said pallet or slip sheet from said feed flow rails to an unloading or transfer position on said pivotable switch flow rail assembly.

10. The invention of claim 7 wherein flow retarders are provided along the feed flow rails and/or the return flow rails to slow the flow of said pallet or slip sheet along said flow rails.

11. The invention of claim 7 wherein said load transfer and return system is incorporated into an overall storage system including other types of rack storage systems.

12. A load transfer and cart and/or pallet return storage system comprising:
   at least one pair of spaced, parallel feed rails defining rolling surfaces;
   at least one pair of spaced, parallel return rails defining rolling surfaces;
   a pivotable transfer means to selectively transfer a cart and/or a pallet from said feed rails to said return rails;
   a cart, pallet and/or slip sheet stop means included on said transfer means for preventing cart, pallet or slip sheet derailment or misalignment during transfer of said cart, pallet or slip sheet from said feed rails to said return rails, wherein said cart, pallet or slip sheet stop means may automatically disengage upon said transfer means achieving a full transfer position and the transfer of said cart, pallet or slip sheet to said return rails and then automatically returns to an operative position upon completion of transfer.

13. The invention of claim 12 including means to enable the selective activation of said transfer means in order to transfer said carts and/or pallets from said feed rails to said return rails.

14. The invention of claim 12 including a cart, pallet or slip sheet advance means to permit the selective release of said carts, pallets or slip sheets from said feed rails to an unloading or transfer position on said transfer means.

15. The invention of claim 12 wherein the load transfer and cart and/or pallet return storage system is incorporated into an overall storage system including other types of rack storage systems.

16. A load transfer and cart and/or pallet return storage system comprising:

at least one pair of spaced, parallel feed rails defining rolling surfaces;

at least one pair of spaced parallel return rails defining rolling surfaces; and, a pivotable transfer means including a switch rail and a swing support to selectively transfer a cart and/or pallet from said feed rails to said return rails.

17. The invention of claim 16 wherein said transfer means includes a cart and/or pallet stop.

18. The invention of claim 17 including a cart and/or pallet advance means for enabling the selective flow of carts and/or pallets along said feed rails to an unloading or transfer position on said switch rails.

19. The invention of claim 16 wherein the load transfer and cart and/or pallet return storage system is incorporated into an overall storage system including other types of rack storage systems.

20. A load transfer and return system comprising:

at least one pair of spaced, parallel feed rails having rolling surfaces;

at least one pair of spaced, parallel return rails having rolling surfaces and positioned below said feed rails;

at least one cart having wheels for rolling engagement with said rolling surfaces of said feed rails and said return rails;

a pivotable transfer means including a switch rail assembly to enable the selective transfer of said cart from said feed rail to said return rails;

a transfer activation assembly to enable the selective operation of said switch rail assembly to effectuate transfer of said carts from said switch rail assembly to said return rails;

a cart stop on said switch rail assembly to prevent cart derailment during said transfer of said cart from said switch rail assembly to said return rails;

a cart advance mechanism to enable the selective release of said cart from said feed rails to said switch rail assembly for unloading and subsequent transfer to said return rails; and, means to dampen said switch rail assembly during transfer of said cart from said switch rail assembly to said return rails and to return said switch rail assembly to a stored or unloading position upon completion of transfer, said means to dampen included on said transfer means.

21. The invention of claim 20 wherein the load transfer and return system is incorporated into an overall storage system including other types of rack storage systems.

22. A load transfer and return system comprising:

at least one pair of spaced, parallel feed rails having rolling surfaces;

at least one pair of spaced, parallel return rails having rolling surfaces and positioned below said feed rails;

at least one cart having wheels for rolling engagement with said rolling surfaces of said feed rail assembly and said return rails;

a pivotable transfer means including a switch rail assembly to enable the selective transfer of said cart from said feed rail to said return rails;

a transfer activation assembly to enable the selective operation of said switch rail assembly to effectuate transfer of said carts from said switch rail assembly to said return rails;

a cart stop on said switch rail assembly to prevent cart derailment during said transfer wherein said cart stop automatically engages said cart during said transfer of said cart from said switch rail assembly to said return rails and automatically disengages said cart when said transfer means is in full transfer position; and, a cart advance mechanism to enable the selective release of said cart from said feed rails to said switch rail assembly for unloading and subsequent transfer to said return rails.

23. The invention of claim 22 wherein the load transfer and return system is incorporated into an overall storage system including other types of rack storage systems.

24. A load transfer and return system comprising:

at least one pair of spaced, parallel feed rails having rolling surfaces;

at least one pair of spaced, parallel return rails having rolling surfaces and positioned below said feed rails;

at least one cart having wheels for rolling engagement with said rolling surfaces of said feed rail assembly and said return rails;

a pivotable transfer means including a switch rail assembly to enable the selective transfer of said cart from said feed rail to said return rails;

a transfer activation assembly to enable the selective operation of said switch rail assembly to effectuate transfer of said carts from said switch rail assembly to said return rails;

a cart stop on said switch rail assembly to prevent cart derailment during said transfer of said cart from said switch rail assembly to said return rails;

a cart advance mechanism to enable the selective release of said cart from said feed rails to said switch rail assembly for unloading and subsequent transfer to said return rails; and, wherein said cart includes means to cooperate with said cart advance mechanism to permit unobstructed flow of said cart from said feed rails to said switch rails when said cart advance mechanism is activated.

25. The invention of claim 24 wherein the load transfer and return system is incorporated into an overall storage system including other types of rack storage systems.

26. A load transfer and return system comprising:

at least one pair of spaced, parallel feed rails having rolling surfaces;

at least one pair of spaced, parallel return rails having rolling surfaces and positioned below said feed rails;

at least one cart having wheels for rolling engagement with the feed and return rails;

a pivotable transfer means to enable the selective transfer of the cart from the feed to the return rails;

a transfer activation assembly to enable the selective operation of the pivotable transfer means to effectuate transfer of said cart from the pivotable transfer means to the return rails;

a cart advance activation mechanisms to enable to selective release of said cart from the feed rails, to the pivotable transfer means for unloading and then transfer to the return rails; and, means on the cart to cooperate with the cart advance mechanism to permit unobstructed flow of the cart from the feed rails to the pivotable transfer means when the cart advance mechanism is activated.

27. The invention of claim 26 wherein the load transfer and return system is incorporated into an overall storage system including other types of rack storage systems.

* * * * *